Jan. 23, 1968  B. VON PLATEN ETAL  3,365,129
THERMOSTAT MIXER
Filed Sept. 7, 1965  2 Sheets-Sheet 1
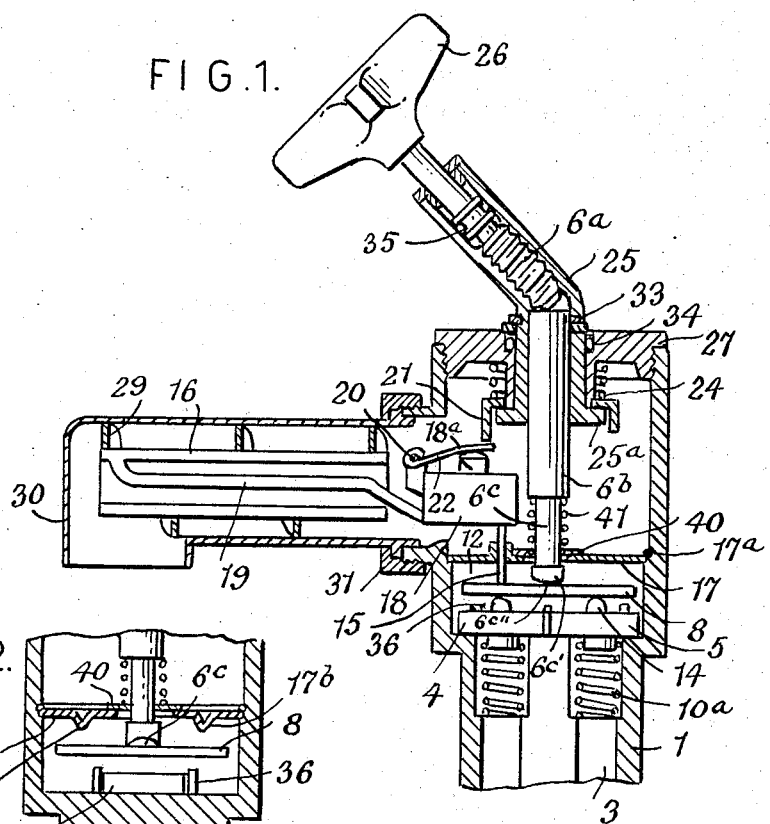
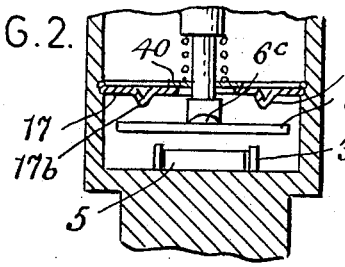
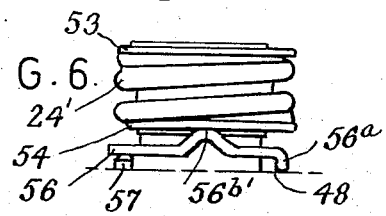
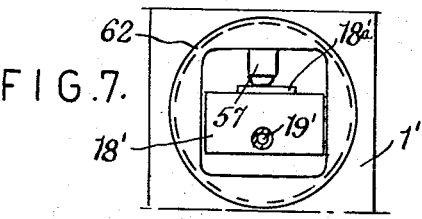
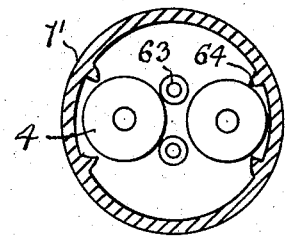
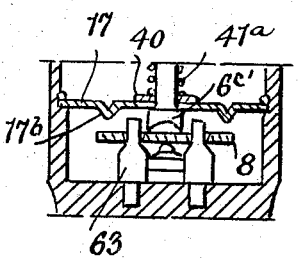
INVENTOR.
Baltzar Von Platen
Finn Lennart Jonsson
BY
Attorney Jan. 23, 1968   B. VON PLATEN ET AL   3,365,129
THERMOSTAT MIXER
Filed Sept. 7, 1965   2 Sheets-Sheet 2

INVENTOR.
Baltzar Von Platen
BY Finn Lennart Jonsson
Attorney

United States Patent Office 3,365,129
Patented Jan. 23, 1968

3,365,129
THERMOSTAT MIXER
Baltzar von Platen and Finn Lennart Jonsson, both of Gotgatan 66, Stockholm, Sweden
Filed Sept. 7, 1965, Ser. No. 489,460
Claims priority, application Sweden, Sept. 9, 1964, 10,818/64
4 Claims. (Cl. 236—12)

ABSTRACT OF THE DISCLOSURE

A thermostatic mixer for hot and cold water having a valve chamber in which separate spring-biased hot and cold water valves are located and which control the flow of hot and cold water into said chamber. The chamber is divided by a fixed partition with which a third valve is operative to control the flow of water from said chamber to a second chamber on the opposite side of the partition, the latter chamber communicating with a water outlet. A sensory body in the latter chamber automatically controls the actions of the valves when the temperature of the water is varied, the third valve being effective to uncover an aperture in the partition to allow the flow of water from the first chamber into the second chamber, means being provided to control the action of the third valve so that the same will be opened only after the hot and cold water valves or one or the other of them has been opened to a predetermined extent.

---

This invention relates to an apparatus for the mixing of hot and cold water and by which a desired temperature of the mixed water can be automatically obtained. The apparatus is thus both a thermostat and a mixer and it is therefore herein referred to as a "thermostat mixer."

The invention is an improvement on the type of thermostat mixer which has the following characteristics: In the usual thermostat mixer there is a hot water valve and a cold water valve, a device for opening and closing said valves and which valves serve to completely shut off the water flow as well as regulate its temperature; and it includes a sensory body from which an effect is automatically transmitted to the valve when the temperature is regulated, whereby the hot water valve moves toward closing with the rising temperature of the mixed water, and the cold water valve moves toward opening.

It has, however, been noted that in such a thermostat mixer that the temperature, when the escaping water flow is small per time unit, may vary rather considerably. The explanation for the temperature variations is the following: At reduced water flow the combined opening distance of the valves is small. An error in the opening distance, and which error is small when measured in length, will be great when measured relatively, that is to say when measured in relation to the small opening distance. A simple way to eliminate this deficiency is to make a thermostat mixer according to the present invention.

The characteristics of the present invention are that the space in which the valves are located, is shut off from outside by means of a partition wall through which there is an opening of at least capillary magnitude and which opening can be enlarged when the mixer is being opened.

In the accompanying drawings, wherein some embodiments of the invention are disclosed, FIG. 1 shows an embodiment of a thermostat mixer fconstructed according to the invention and shown in section through its geometric axis;

FIG. 2 shows the thermostat mixer in section along the line II—II of FIG. 1, and in which the surfaces of the section are perpendicular to each other;

FIG. 4 is a sectional view taken along the line IV—IV in FIG. 3;

FIG. 5 shows a section taken along the line V—V in FIG. 3;

FIG. 6 shows some details of the upper part of FIG. 3; and

FIG. 7 is a view taken along the line VII—VII in FIG. 3, after the water spout has been removed.

Figure 3:
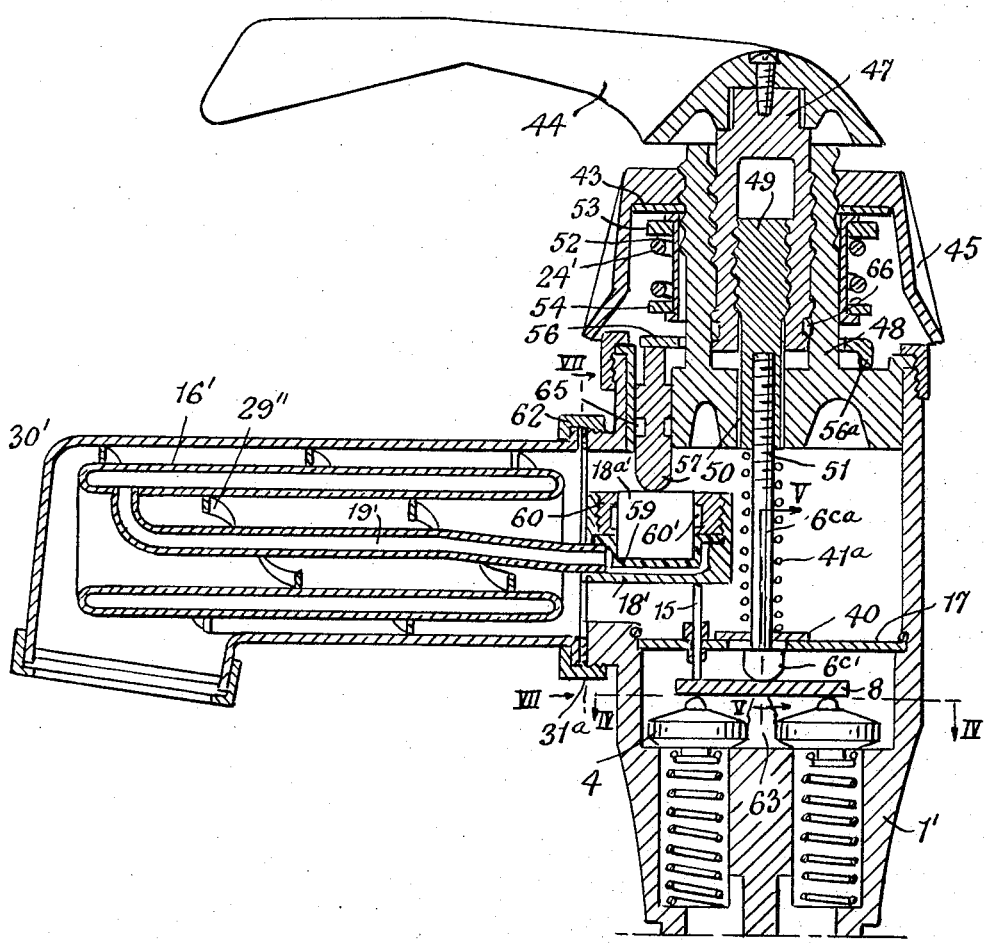
FIG. 3 shows another embodiment of the thermostat mixer in section through its geometric axis.

In FIG. 1 the frame of the device is shown at 1, the hot water passage at 2, the cold water passage at 3, the hot water valve at 4 and the cold water valve at 5. The spindle, in this embodiment the invention, consists of the threaded part 6a and the rods 6b and 6c.

The part 6c terminates at its lower end in the head 6c', which has an edge 6c". The edge 6c" rests against a two-armed lever 8. This lever 8 in its simplest form, consists of a round, plane-parallel disc that is loose in the space shown at 12. The disc is activated from beneath at the point 9 by a force from the valve 4, which force emanates from the compression spring 10 and the pressure in the hot water channel 2. Furthermore it is actuated from underneath at the point 14 by a force from the valve 5, which force emanates from a weaker compression spring 10a and the pressure in the cold water channel 3. The upper surface of the disc 8 rests against a rod 15 and, as mentioned, against the edge 6c". When the disc 8 is in its upper or elevated position, it does not rest against said edge 6c" but instead rests against two points or small dome-like protuberances 17b shown in FIG. 2. These domes are in the form of pressed-out bulges in the disc 17, which disc forms the upper wall of restriction or the ceiling of the space 12. The disc 17 is retained in the frame 1 by means of a resilient ring 17a.

The rods 6c and 15 extend through the disc 17. The rod 15 rests with its upper part against a cylinder 18, from which a piston 18a protrudes. Sealing between the piston and cylinder is achieved, and since it is of minor importance it is not herein described in detail.

The cylinder 18 communicates, by means of an elastically pliable capillary tube 19 with the space in a container 16. This space and the tube 19 and the cylinder 18 are filled with some suitable liquid with great thermal expansion coefficient, which liquid constitutes the sensory body. The piston 18a rests against a lever 22, and this lever is pivotally supported in a bearing so that it can swing around its axle 20. Its outer part rests against a cam 21. The cam 21 is pressed downwardly by a spring 24, until it is halted by contact with the lever 22 or by the flange 25a on a tubular part 25. This part 25 can by means of the knob 26 be swung around the geometric axis of the rod 6b. When it is swung, the cam 21 partakes in the movement. The part 25 is supported in the lid 27, which is fastened in the frame 1, and is kept secure by the washer 32 and a split resilient ring 33.

The container 16 is surrounded by a spiral guide 29 for the water, said guide being located within the water spout 30, which is fastened to the frame 1 by means of the nut 31. Two sealing O-rings are respectively shown at 34 and 35, and a pair of guide pins are shown at 36 for the respective valves 4 and 5.

Means essential to the invention are as follows: Such means includes a washer 40 provided with a centrally located hole, the diameter of which is only slightly larger than that of the rod 6c. The washer fits snugly around the rod 6c. This washer 40 is pressed downwardly by means of the spring 41, which has its upper end urged against the bottom of the part 6b. When the mixer is closed, the washer 40 rests against the disc 17. When the mixer is opened the washer is raised by the head 6c'. It is important that the space 12 shall communicate with the space existing above the disc 17, by a channel or channels in which the flow resistance is great. To arrange a specific means for such communication between the two above-mentioned spaces is unnecessary, as neither the pin 15 nor the washer 40 establish a seal between the two spaces. Two capillary channels are thus obtained automatically. It is very easy to regulate the flow resistance in them, so that this arrangement is most suitable. The flow resistance may not be infinitely great, that is the cross section of the capillary channels may not be zero, so that complete sealing occurs. In that case cold water could leak over to the hot water channel and vice versa. There should be no possibility to see such leakage from the outside.

The described thermostat mixer functions as follows:

When closed, the knob 26 and the part 6a of the spindle are tightened. The parts 6b and 6c are urged downwardly. By means of the edge 6c" the disc 8 is pressed against the valves 4 and 5 and keeps these valves closed. The washer 40 rests against the disc 17 but does not tighten forcibly against this. Neither does the rod 15 tighten forcibly against said disc 17 as was mentioned. The mixer is now opened by turning of the knob 26. This begins a first phase of the opening of the mixer. The parts 6b and 6c move upwardly together with the gravity point of the disc 8. Whether only its left part or its right part swings upwardly, or the whole disc moves bodily upwardly parallel with itself, depends upon the temperature of the sensory body and the position of the cam 21, that is, the setting of the temperature. Assuming that the entire disc 8 moves bodily upwards parallel with itself. In such case both of the valves 4 and 5 will open. Water escapes through the spacing between the rod 15 and the disc 17 and between the disc 17 and the washer 40. As heretofore mentioned, these spacings are small so that the water quantity escaping per time unit is very small. Then the spindle 6a is unscrewed further. When the upper side of the head 6c' contacts the washer 40, the disc 8 contacts the two points 17b. Here the first phase of the opening is beginning to end and a second phase is starting. Now the washer 40 lifts from the disc 17 and the water flows out in the desired quantity. During this second phase the disc 8 swings over the points 17b. This swinging is regulated by the sensory body. If the temperature of the escaping water should, for example, be too high, that is higher than that which corresponds to the setting of the cam 21, the sensory body will expand. During such expansion the cylinder 18 moves downwardly, during which time the capillary tube 19 resiliently bends and the piston 18a rests immovably against the lever 22. If the temperature of the water is too low, the movements will, of course, be the reverse. When it is desired to change the temperature the cam 21 is turned. That is, the knob 26 is swung around the geometric axis of the rod 6b. When this is done, the lever 22 comes into contact with another part of the cam 21, positioned either higher or lower on the same, depending upon the desired temperature. If the cam 21 is turned quickly, so that a lower point on the same comes into contact with the lever 22, the spring 24 is compressed and the contact between the cam and the flange 25a is broken. It returns when the water temperature has had time to reach its correct value, that is, after a half second to a couple of seconds.

During the first phase of the opening of the mixer, the regulation is not instantly secured. It will be understood that this depends upon the fact that the opening heights of the valves during the phase are linearly or numerically small so that an error in the motion of the rod 15, that is, in the reaction of the sensory body 16, which error linearly or numerically may be small, can become substantial in relation to the small opening height. The incorrect temperature regulation during the first phase is however, of quite minor importance, as the escaping amount of water is insignificant. It is so small, consisting of only a few drops per second so that it is of no importance even if this small quantity of water is either very hot or very cold. In either case can it cause any damage or inconvenience. It is not required that the thermostat mixer during the first phase shall be able to regulate the temperature correctly. When the second phase starts, that is when the washer 40 starts to lift from the disc 17 and the disc 8 moves on to or has moved on to contact with the points 17b, the opening heights of the valves have become so great that a possible error in the motion of the rod 15 becomes small in relation to the opening heights, even if the error may be great linearly.

As will be apparent, both the quantity of the water and the temperature are regulated with only one element such as the knob 26. This can be done in other ways, such as by means of two separate control elements, which will be shown in connection with FIGS. 3–7.

The container 16 of the sensory body can be placed in a different way and in another location than that shown.

The invention is not to be limited so that the element which actuates the valves is a double-armed lever such as the disc 8. The same result can be attained by means of other elements and without the lever, as is described for example, in my Belgian Patent No. 621,987. The invention can, with advantage be applied not only to thermostat mixers such as described, but probably also to other thermostat mixers that possess the characteristics mentioned herein.

Another embodiment of the invention is disclosed in relation to FIGS. 3 and 7. The spout 30 in FIG. 1 corresponds to the spout 30' in FIG. 3. The sensory body 16 in FIG. 1 is indicated at 16' in FIG. 3. The channel 19 is indicated at 19'. Elements that are not only similar in function, but also similar as to shape are indicated by similar reference characters. Such elements are, for example those indicated at 8, 6c" and 15.

The sensory body 16' is in FIG. 3 equipped with guide fins 29' both on the outside and as indicated at 29" on the inside. The water flow is regulated by means of the handle 44 and the temperature by the wheel 45. By means of the said handle 44, the tube-shaped part 47 is turned, which part is provided with inside and outside threads, of which one is left-threaded and the other right-threaded. The outer thread fits into the inner thread in the tube-shaped part 48, and the inner thread fits into the thread of the upper part of the rod 49. Splines 50 prevent said rod 49 from turning. Said two threads in the rod 47 have been provided in the known manner, so that the rod 49 will move sufficiently enough at a certain movement of the handle 44. In the rod 49, another rod 6ca is fastened by means of a thread 51 and a common counter-nut 6c in FIG. 1, the rod 6ca corresponding to the rod 6c in FIG. 1. The spring 41a, acting on the washer 40, corresponds to the spring 41. The distance between the washer 40 and the upper part of the head 6c', when the valves are fully closed, can be regulated by means of the thread 51. This distance is equal to half the combined opening distances of the valves during the first phase. Experiments have proven that this distance should be between ½ and 1 mm.

As herein mentioned, the temperature is regulated by the wheel 45. Its inner thread fits into the outer thread of the part 48. Inside of the wheel there is a plane slide ring or slide plate 43, against which the thin tube 52 rests. This is provided upwardly and downwardly with bent-over edges. The upper edge limits the upward movement of the circular, ring-shaped plate 53, while the lower edge limits the downward movement of the plate 54. Between the two plates is positioned the spring 24' which corresponds to the spring 24 in FIG. 1. The ring-shaped plate 56 rests in a point on the rod 57. It rests through the edge or the point 56a on a flat part of the element 48. On the plate 56 there are two diametrically opposed bulges or edges 56b' and 56b". The bulge or edge 56b' is visible in FIG. 6.

These two bulges 56b' and 56b" rest against the plate 54. The rod 57 rests with its lower part against the piston 18a' which corresponds to the piston 18a in FIG. 1. The cylinder 18' rests against the rod 15 similarly to what was described in connection with FIG. 1.

When the wheel 45 is tightened, it sometimes happens that the plate 54 is pushed upwards by the bulges 56b' and 56b''. It consequently leaves the contact with the lower flange of the tube 52. When this occurs, the hot water valve 4 is always closed similarly to what was mentioned in connection with FIG. 1. It remains closed until the piston 18a', on account of the decrease in volume of the sensory body, has moved downwardly so much that contact has again been established between said plate 54 and the lower flange of the tube 52. The temperature of the water flow is determined by the position of the wheel 45.

A suitable way of making the pressure mechanism 18' and 18a' is to surround the latter, the piston, with a rubber diaphragm 59 which acts as a seal by being squeezed firmly against the cylinder 18' by means of the ring 60. This ring is screwed into the said cylinder. Its inner surface is the cylindrical surface against which the piston 18a' slides. This surface in a known manner, has a very short extension in the direction of the piston's geometric axis, as an internal recess is machined in the part 60. Through the short extension of the surface the piston 18a' is prevented from getting stuck in its cylinder bore by the rubber material that is produced by wear.

In the disclosed construction the sensory body is preferably Silicon oil and the rubber diaphragm 60 is of such quality that for a practically unlimited time it resists contact with said oil. The cylinder 18' is guided by the frame 1', FIG. 7. The piston and cylinder can be replaced by a bellows. Bulges corresponding to the bulges 17b in FIG. 2, also exist in the disc 17 in FIG. 3, but such bulges are only shown in FIG. 5. In FIGS. 3 and 7 a thread, through which the spout 30' is fastened to the frame 1' is indicated at 62. Two guide pins are indicated at 63. Their lower and wider part guides the valves (FIG. 3), while their upper and narrower part guides the disc 8 (FIG. 5). In the frame 1' there are four ridges 64 (FIG. 4) for guiding the valves. Two O-rings for sealing off the water are indicated at 65 and 66.

The discs 17 and 40 can be placed anywhere in the water flow. Their purpose is to break up the water flow but never to prevent the same. It is of course unimportant where this disc arrangement is located. It can be located close to the valves 4 and 5, as is shown in the two embodiments (FIGS. 1 and 3), or for example, close to the right portion of the sensory body 16 in FIG. 1 or 16' in FIG. 3. When the position of said discs is changed the design can also be changed, but without departing from the spirit of the invention.

Having thus described embodiments of the invention, it is obvious that the same is not to be restricted thereto, but is broad enough to cover all structures coming within the scope of the annexed claims.

What we claim is:

1. A thermostatic mixer comprising, a housing containing a chamber in which hot and cold water valves are contained, said chamber having a fixed partition wall provided with an aperture, a spindle effective to open or close the valves or either of them, said spindle projecting through said aperture, a spring-biased washer carried by the spindle above the aperture and normally covering said aperture, and a head on the spindle located under the partition wall and of less diameter than the aperture in said wall for movement of the head through the aperture and for engaging under and raising the washer from over the aperture to permit water from within the valve chamber to flow therefrom.

2. A thermostatic mixer comprising, a housing containing a valve chamber in which hot and cold water spring-biased valves are contained, said chamber being shut off from outside by a partition disc, a tilting valve disc arranged over the valves and below the partition disc, the partition disc having a central opening, a spindle mounted in the housing above the partition disk and having its lower end extended through the opening therein to contact with the tilting disc, a spring-biased washer carried by the lower end portion of the spindle above the partition disc, said washer fitting over and normally covering the opening but being displaceable therefrom upon raising movement of the spindle, the partition disc having an aperture, a pin extending from the top of the tilting disc through said aperture, a cylinder against which the upper end of the pin engages, a thermostatically-controlled arrangement coupled to the cylinder, and cam means limiting the operative effect of the cylinder on the pin and the effect of the pin on the tilting disc.

3. A thermostatic mixer according to claim 2, wherein the spindle has a head on its lower end in contact with the tilting disc, which head is effective to engage under and raise the washer on the elevating movement of the spindle.

4. A thermostatic mixer for hot and cold water and provided with a hot water valve (4) and a cold water valve (5), a device for manual opening and closing of said valves, a sensor body (18, 19) from which action is automatically conveyed to the valves when the temperature of the water is regulated, whereby the hot water valve on rising temperature of the mixed water moves toward closing and the cold water valves moves toward opening, characterized by the fact that the two valves are located in a space (12) communicating with an outlet through a third valve (40) operative through an aperture in a fixed partition (17) located between the space 12 and the outlet and by which the amount of water flow can be manually regulated by means of said device (6) by which the two first valves (4, 5) can be manually opened and closed, which third valve (40) can be opened by means of said device (6) but not until after the two first valves (4, 5) or one of them has been opened to a certain extent.

References Cited

UNITED STATES PATENTS

| 2,132,689 | 10/1938 | Hermann | 236—12 |
| 2,430,133 | 11/1947 | Muffly | 236—12 |
| 2,997,239 | 8/1961 | Priesmeyer | 236—12 |
| 3,228,603 | 1/1966 | Norman | 236—12 |

EDWARD J. MICHAEL, *Primary Examiner.*

ROBERT A. O'LEARY, *Examiner.*

W. E. WAYNER, *Assistant Examiner.*